Nov. 21, 1961     Y. C. BURNETT     3,009,737
SEAT MOUNTED UTILITY TABLE

Filed May 26, 1960     3 Sheets-Sheet 1

INVENTOR.
YALE C. BURNETT
BY Edwin Coates
-ATTORNEY-

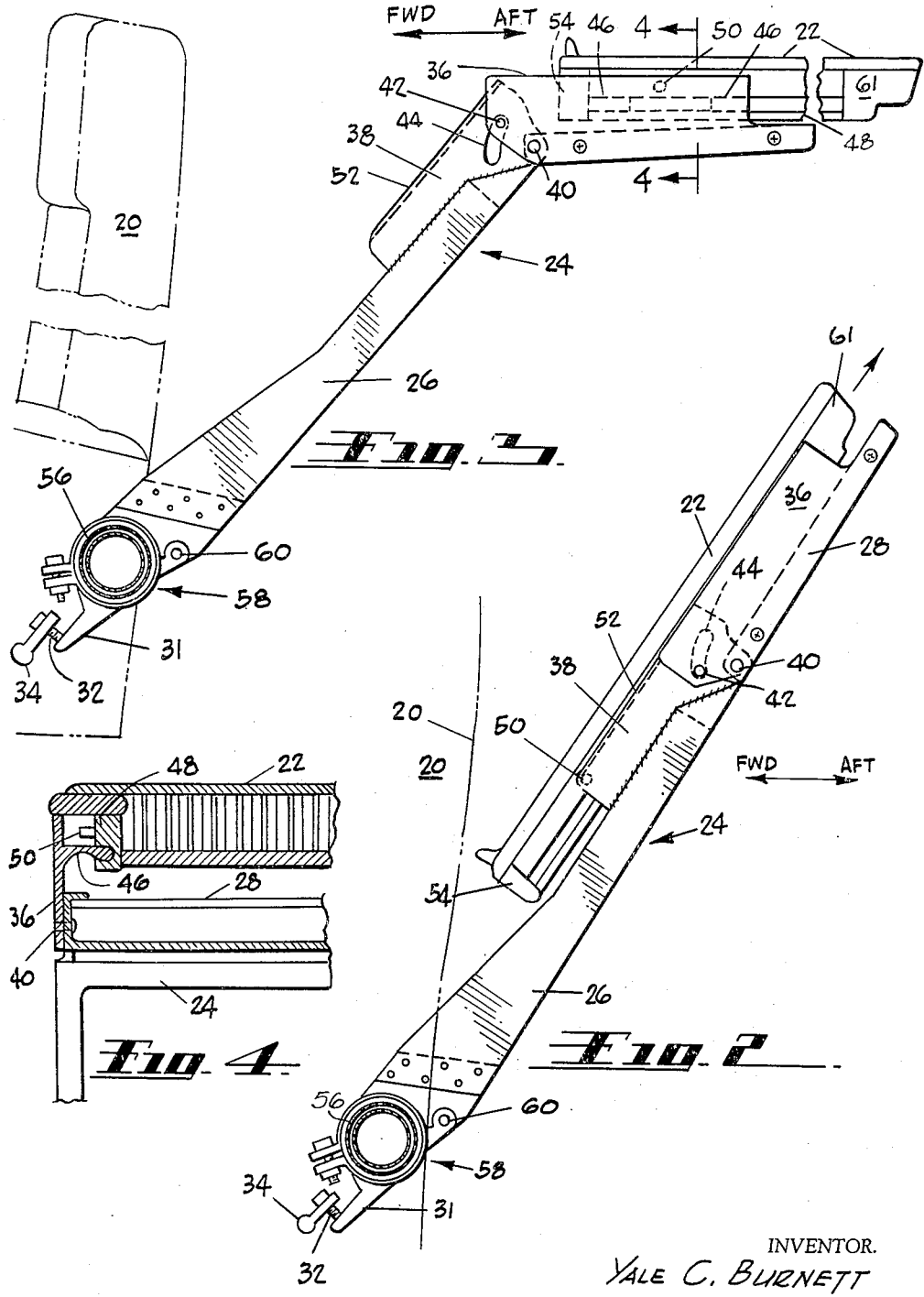

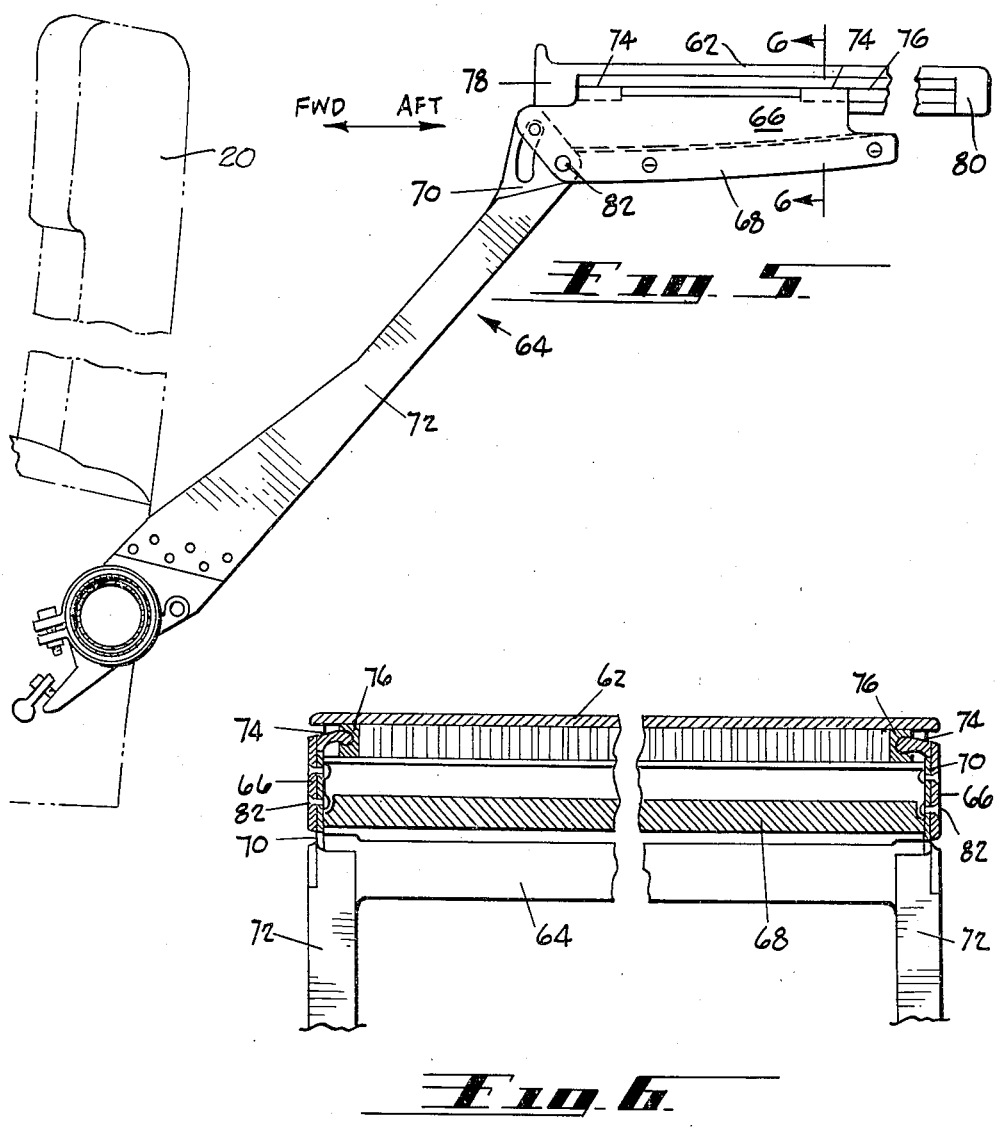

3,009,737
SEAT MOUNTED UTILITY TABLE
Yale C. Burnett, Santa Monica, Calif., assignor to Douglas Aircraft Company, Inc., Santa Monica, Calif.
Filed May 26, 1960, Ser. No. 31,925
5 Claims. (Cl. 297—146)

This invention relates to a utility table which is mounted in the upright back of a vehicle seat for use by the passenger occupying the seat in back of the first seat, and more particularly to a table which is adapted for use with seats which are reclinable, such as those found on aircraft.

The table of the present invention is constructed in such manner that, when it is not in use, it is fully retracted into the back of the seat, providing maximum space between the rows of seats for entry and egress of the passengers and preserving the aesthetic lines of the seat. When open for use, the table is further provided with adjusting means which will permit the table top or tray to be moved fore and aft for maximum comfort and convenience of the passenger using the table. The table is also mounted in the seat in such manner that, in the fully extended position of the table, the passenger in the seat to which the table is attached can recline the seat or bring it back to the upright position without materially affecting the table.

Other features and advantages of the table of the present invention can be better understood by reference to the accompanying drawings in which:

FIG. 2 is a side elevational view of the table in a partially opened position;

FIG. 3 is a side elevational view of the table in the fully opened position;

FIG. 4 is a fragmentary sectional view of the table taken along the line 4—4 in FIG. 3;

FIG. 5 is a side elevational view of another embodiment of the table in a smaller and more compact size than the table shown in the preceding figures; and FIG. 6 is a fragmentary sectional view of the table taken along the line 6—6 of FIG. 5.

Figure 1:
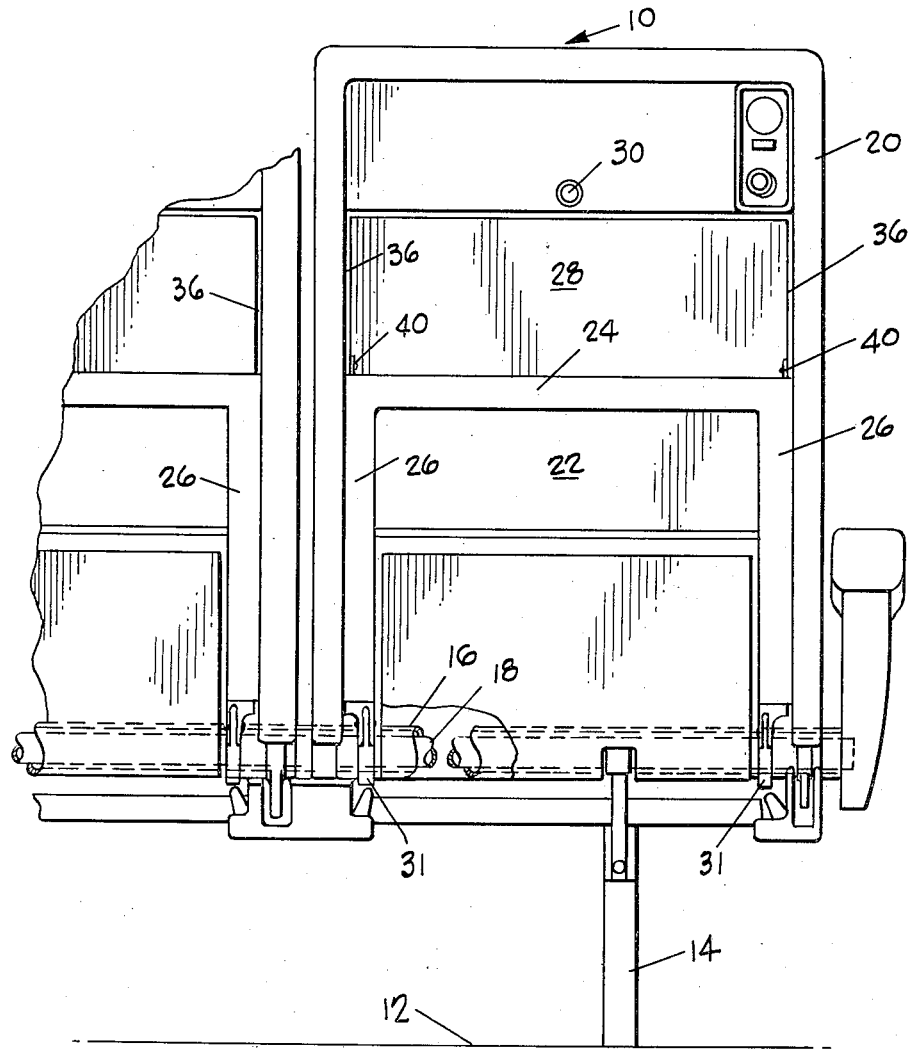
FIG. 1 is a front elevational view of the table shown retracted into the back of an aircraft seat.

FIG. 1 shows the rear of an aircraft seat 10 in a row of seats which is suitably attached to the floor 12 by a support member 14. Seat 10 includes an outer torque tube 16 rotatably mounted on an inner torque tube 18, which permits reclining movement of the upright seat back 20. The table of the present invention, shown retracted into the seat back, includes a table top or tray 22 (the under face of which is shown), a U-shaped support frame 24 having arms 26 pivotally mounted on the outer torque tube 16, and a support panel 28. The table is held in place by a latch mechanism (not shown) near the top of the seat back.

As shown in FIGURES 2, 3, and 4, the table top 22 is connected to the support frame 24 by means of side plates 36 which are attached to each side of panel 28. The side plates 36 are hinged to L-shaped guide members 38 on arms 26 by means of a fixed pin 40 and a movable pin 42 which rides in a curved slot 44 in the guide member 38 when the table top is opened or closed. More explicitly, pin 42 and slot 44 cooperate to restrict rotational movement of the table top about pin 40 from a vertical position in line with the arms 26 (FIG. 2) to a horizontal or serving position (FIG. 3).

In the horizontal position, the table top may also be moved fore and aft on a pair of inwardly directed tracks 46 on side plates 36. Runners 48 mounted on an undercut portion on each side of the table top engage the tracks 46. Forward movement of the table top shown in FIGURES 2, 3, and 4 is restricted by pins 50 mounted on each of runners 48 when such pins come in contact with the short legs 52 of guide members 38. Aft movement is restricted by contact of shoulder 54 in the undercut portion of the table top with the left track 46, as shown in FIG. 3. This fore and aft movement of the table top assures maximum comfort and convenience to the passenger using the table.

The table of the present invention is constructed so that it is not materially affected by the reclining and righting of the containing seat. As shown in FIG. 2, arms 26 are pivotally mounted on outer torque tube 16 by means of a grooved plastic bushing 56. The bushing may be polytetrafluoroethylene, nylon, or other plastic having a low coefficient of friction. A clamp assembly 58 subtending the arms 26 rigidly grips the grooves of the bushing so that the assembly and the bushing rotate around the torque tube as a unit. The clamp assembly can be opened about pivot point 60 for attachment of the support frame to the outer torque tube 16. Because of the slippage of bushing 56 on the outer torque tube 16, the seat back 20 can be reclined and righted without materially affecting the table. Reclining movement of the seat back is generally restricted so as not to impinge upon the table in the fully extended position. If the table top should be only partially extended so that the seat back will come in contact with it when reclined, the table top will be pushed aftward by the seat back.

The table is opened from the retracted position by depressing button 30 (FIG. 1) and pulling on panel 28. This causes support frame 24 to extend aftward, rotating about outer torque tube 16 until stop 31 (FIG. 2) at the bottom of the arms 26 contacts adjustable bolts 32 mounted on member 34 in the seat base. At this point, the table will be in the position shown in FIG. 2. Table top 22 is then pulled upwardly until pins 50 clear the short legs 52 of the guide members 38. The table top 22 will then rotate about pin 40 and assume the horizontal or serving position shown in FIG. 3, mainly because of its own weight. The hinge arrangement in which pins 40, 42 and slot 44 cooperate has been previously described. The table top can then be pulled aftward to suit the convenience of the passenger.

When the table is no longer needed, it can be put away by first pushing the table top forward until pin 50 contacts leg 52 of the guide member 38. The table top is then lifted about pin 40 to bring it into alignment with the arms 26. Thereupon, the table top will slide downwardly until a shoulder 61 in the undercut portion of the table engages with the right track 46 as shown in FIG. 2. The table is then pushed forwardly and upwardly into the recessed portion of the seat back where it will be retained by the latching means.

The table shown in FIGS. 5 and 6 is adapted for use in high density seating arrangements. In this type of arrangement, the seats are narrower and the spacing between the rows of seats is less than that found in the premium seating arrangements. Because of the limitations in space, table top 62 shown in FIG. 5 is smaller than top 22 shown in the previous figures. Except for this dimensional difference and some consequential differences in structure to be hereinafter described, the two tables are essentially the same. Table top 62 is connected to the support frame 64 by means of side plates 66 which are attached to each side of support panel 68. The side plates 66 are hinged to an extension 70 on arms 72 by the same hinging arrangement as previously described in connection with the table of the preceding figures. Fore and aft movement of the table is made possible by a pair of inwardly directed tracks 74 on side plates 66 which engage runners 76 in an undercut portion on each side of the table. Aft and fore movement here is restricted by left and right shoulders 78, 80 in the undercut portion.

In retracting the table from the serving position shown in FIG. 5, table top 62 is pushed forwardly until shoulder 80 contacts right track 74. The table top and panel 68 are then pushed upwardly and forwardly until engagement is made with the latching mechanism in the seat. In opening the table from the retracted position, the latching mechanism is released by depression of a button similar to 30 and the table is pulled aftwardly whereupon table top 62 will pivot about pin 82 mainly because of its own weight. The attachment of the arms 72 to the outer torque tube is the same as that previously described in connection with the table of the previous figures.

To make the table of the present invention as light as possible and still have the necessary strength, the support frame 24 is made of sheet metal with a hollow cross section. The table tops 22, 62 are made of plastic reinforced laminated glass fiber with a paper honeycomb core. The panels 28, 68 are made of a deep drawn metal pan with a muslin cover. Additional decorative material such as vinyl fabric may be added to the underside of the table and to the support panel to blend in with the decor of the seat and the cabin interior.

Although the presently preferred embodiments of this invention have been shown and described, it is to be understood that the invention is susceptible to variation in form and construction within the scope of the appended claims.

I claim:

1. In combination, a vehicle seat having an upright seat back; a torque tube traversing the base of the back and supporting the back; and a utility table adapted for retraction into the back; said table comprising a U-shaped support frame; pivotal means for retraction and extension movement of the frame; said pivotal means including a clamp assembly at the lower ends of each of the frame arms and a pair of polytetrafluoroethylene bushings mounted in spaced relationship on the torque tube and held by the clamp assemblies; adjustable stop means at the lower ends of each of the frame arms for controlling extension movement of the frame; a support panel assembly extending between the upper extremities of the frame arms; side plates on each side of the support panel assembly; a table top connected to the side plates by slide means whereby the top can be adjusted in the horizontal position, said slide means including runners in an undercut portion on each side of the table top and a pair of inwardly directed tracks on each of the side plates which engage the runners; and hinge means for connecting each of the side plates and the table top to the upper extremity of each of the frame arms and for rotational movement of the table top from a closed vertical position in alignment with the frame arms to a horizontal serving position; said hinge means including a fixed pin and a movable pin riding in a curved slot.

2. A retractable utility table for a vehicle seat having an upright back and a torque tube traversing the base of the back and supporting the back, said table comprising: a hollow, U-shaped support frame; pivotal means and stop means on the lower ends of the frame arms cooperating respectively with the torque tube and the seat base for rotational movement of the frame from a retracted position in the seat back to a diagonally extended position away from the back; extension members at the upper ends of the frame arms; and a table top assembly hinged to the extension members for rotational movement of the assembly from a closed vertical position in alignment with the frame arms to a horizontal serving position, said assembly including track and runner means in freely slidable frictional engagement at the sides of the table top for horizontal adjustment of the table top in the serving position and for downward displacement of the table top preparatory to retraction of the table into the seat back.

3. In combination: an aircraft seat having an upright back; reclining means for the back including a rotatable torque tube traversing the base of the back; and a utility table adapted for retraction into the back, said table comprising: a U-shaped support frame extending diagonally from the base of the back; pivotal means connecting the frame with the torque tube whereby the seat back may be reclined and righted without materially affecting the table in the serving position, said pivotal means including a pair of low friction plastic bushings mounted in spaced relationship on the torque tube and a hinged clamp assembly at the lower ends of each of the frame arms adapted to encircle and rigidly grip the bushings; extension members at the upper ends of the frame arms; and a table top assembly hinged to the extension members for rotational movement of the assembly from a closed vertical position in alignment with the frame arms to a horizontal serving position, said assembly including track and runner means in freely slidable frictional engagement at the sides of the table top for horizontal adjustment of the table top in the serving position and for downward displacement of the table top preparatory to retraction of the table into the seat back.

4. In combination: an aircraft seat having an upright back adapted for reclining movement on concentric torque tubes consisting of a fixed inner tube and a rotatable outer tube; and a retractable utility table mounted in the back for use by a passenger rearwardly from said back, said table comprising: a hollow, U-shaped support frame having arms extending diagonally from the base of said back and being pivotally mounted on the torque tubes for retraction and extension of the table; mounting means for the arms including end-flanged, low friction, plastic bushings on the outer tube and hinged clamp assemblies subtending the arms and adapted to encircle and grip the bushings, whereby the seat back may be reclined and righted without materially affecting the frame as extended; arm extensions at the upper portion of the frame; and a table top assembly hinged to the extensions for rotational movement of the assembly from a collapsed position in alignment with the frame arms to an extended horizontal serving position, said assembly including side plates hinged to the arm extensions, a light, hollow pan connecting the side plates at their bases, inwardly directed track means at the upper portion of the side plates; and a table top having runners for slidable frictional engagement of said track means whereby the table top can be freely moved fore and aft with relation to the seat back.

5. In combination: an aircraft seat having an upright back adapted for reclining movement on concentric torque tubes consisting of a fixed inner tube and a rotatable outer tube; and a retractable utility table mounted in the back for use by a passenger rearwardly from said back, said table comprising: a light, hollow, U-shaped support frame having arms extending diagonally from the base of said back and being pivotally mounted on the torque tubes for retraction and extension of the table; mounting means for the arms including end-flanged, polytetrafluoroethylene bushings on the outer tube and hinged clamp assemblies subtending the arms and adapted to encircle and grip the bushings, whereby the seat back may be reclined and righted without materially affecting the frame as extended; adjustable stop means at the lower ends of each of the frame arms for controlling extension movement of the frame; extension members at the upper ends of the frame arms, said members having an arcuate slot; and a table top assembly hinged to the extensions for rotational movement of the assembly from a collapsed position in alignment with the frame arms to an extended horizontal serving position, said assembly including side plates hinged to the extension members by means of a fixed pin and a movable pin riding in the arcuate slot in the extension members, a light, hollow pan connecting the side plates at their bases, inwardly directed track means at the upper portion of the side plates, and a table top having runners in an undercut portion at each side for slidable frictional engagement of said track means whereby the table top can be freely moved fore and aft with relation to the seat back.

References Cited in the file of this patent

UNITED STATES PATENTS

| | | |
|---|---|---|
| 2,098,426 | McDonald | Nov. 9, 1937 |
| 2,805,904 | Monroe et al. | Sept. 10, 1957 |
| 2,824,599 | Quinlan | Feb. 25, 1958 |

FOREIGN PATENTS

| | | |
|---|---|---|
| 980,497 | France | Dec. 27, 1950 |